(12) United States Patent
Dias et al.

(10) Patent No.: US 12,637,235 B2
(45) Date of Patent: May 26, 2026

(54) HATCH MECHANISM FOR SPACECRAFT, AND ASSOCIATED SYSTEMS AND METHODS

(71) Applicant: Blue Origin Manufacturing, LLC, Huntsville, AL (US)

(72) Inventors: Pedro Henrique Coelho Dias, Santa Clarita, CA (US); Noah Thomas Chartier, Seattle, WA (US); David Gary Terbovic, Maple Valley, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/422,975

(22) Filed: Jan. 25, 2024

(65) Prior Publication Data

US 2025/0242949 A1 Jul. 31, 2025

(51) Int. Cl.
B64G 1/22 (2006.01)
B64G 1/64 (2006.01)

(52) U.S. Cl.
CPC ............... B64G 1/22 (2013.01); B64G 1/646 (2013.01)

(58) Field of Classification Search
CPC . B64G 1/22; B64G 1/646; B64G 1/14; B64G 1/60; B64G 1/64; B64C 1/143; E05D 3/16; F41F 3/077
See application file for complete search history.

(56) References Cited

U.S. PATENT DOCUMENTS

| | | | |
|---|---|---|---|
| 933,070 | A | 9/1909 | Gleason |
| 2,219,461 | A * | 10/1940 | Williams ................ B63B 19/00 |
| | | | 114/177 |
| 4,479,622 | A | 10/1984 | Howse |

(Continued)

FOREIGN PATENT DOCUMENTS

| | | |
|---|---|---|
| KR | 100779798 | 11/2007 |
| KR | 20140002805 | 5/2014 |

OTHER PUBLICATIONS

Collect Space Photo: http://www.collectspace.com/review/spacex_crew4_zero_g_indicators01-lg.jpg, accessed Feb. 20, 2024, 1 page.

(Continued)

*Primary Examiner* — Joshua J Michener
*Assistant Examiner* — Cindi M Curry
(74) *Attorney, Agent, or Firm* — Hogan Lovells US LLP

(57) ABSTRACT

A representative hatch system can include a base portion surrounding an opening, a hatch portion movable relative to the base portion between a closed configuration and an open configuration, and a movement mechanism positioned to move the hatch portion relative to the base portion between the closed and open configurations. The movement mechanism can include four arms pivotably attached to the hatch portion and the base portion via four pivot axes. When the hatch portion is in the closed configuration, the axes can be coplanar. The axes can be spaced apart from a sealing plane between the hatch portion and the base portion. The arms can traverse a periphery of the hatch portion. A representa- (Continued)

tive aerospace system can include a hatch system supported in a wall portion of an aerospace vehicle. The movement mechanism can keep the sealing surface of the hatch facing away from an interior of the vehicle.

20 Claims, 6 Drawing Sheets

(56) References Cited

U.S. PATENT DOCUMENTS

| | | | |
|---|---|---|---|
| 4,601,446 A | | 7/1986 | Opsahl |
| 4,716,623 A | * | 1/1988 | Kinaga ..................... E05D 3/10 |
| | | | 16/370 |
| 4,842,223 A | | 6/1989 | Allton et al. |
| 4,854,010 A | | 8/1989 | Maraghe et al. |
| 5,035,026 A | * | 7/1991 | Carlo ........................ E05D 3/16 |
| | | | 16/302 |
| 6,220,546 B1 | | 4/2001 | Klamka et al. |
| 6,243,918 B1 | * | 6/2001 | Zetti ........................ E05D 3/16 |
| | | | 16/334 |
| 8,307,512 B2 | * | 11/2012 | Osaki ...................... E05D 15/28 |
| | | | 16/366 |
| 10,189,556 B2 | | 1/2019 | Minchau et al. |
| 10,407,965 B2 | | 9/2019 | Alford et al. |
| 10,767,404 B2 | * | 9/2020 | Spoelstra .................. E05D 3/06 |
| 11,560,243 B2 | | 1/2023 | Johnson |

OTHER PUBLICATIONS

To, Koichi et al., "Optimal Design of a Mechanism Used for Opening and Shutting a Ship's Hatch Cover," Journal of Mechanisms, Transmissions, and Automation in Design, Dec. 1984, pp. 503-509, vol. 106, ASME, Osaka Japan.

YouTube video: "Crew Dragon—Interior," https://youtu.be/78ATfCaBn6E?t=38, Feb. 20, 2019, 7 pages.

YouTube video: "Hatch Closing of the Crew Dragon," https://www.youtube.com/watch?v=5Y3VjUB0C4k, Mar. 15, 2019, 2 pages.

YouTube video: "SpaceX Crew Dragon Hatch Opened, Astronauts Enter," https://www.youtube.com/watch?v=Ct80WPZI1h0, Mar. 3, 2019, 2 pages.

* cited by examiner

HATCH MECHANISM FOR SPACECRAFT, AND ASSOCIATED SYSTEMS AND METHODS

TECHNICAL FIELD

The present disclosure is directed generally to hatch mechanisms for spacecraft, and associated systems and methods.

BACKGROUND

Some vehicles, especially spacecraft, require a hatch for facilitating ingress and egress and for providing a seal against the outside environment. Conventional hatch designs include, for example, floating/detachable designs which do not include a hinge, and hatches with fixed hinges on one side that open like a door. Many existing hatch opening and closing mechanisms open in a way that faces the seals and sealing surfaces toward the interior of the vehicle, which increases a risk of damage to the seals and/or sealing surfaces by people or equipment inside the vehicle. Existing hatch opening and closing mechanisms also generally tend to be cumbersome and inefficiently shaped or sized, which is undesirable in many environments, especially in spacecraft. Embodiments of the present technology are directed to addressing these challenges and other challenges.

BRIEF DESCRIPTION OF THE DRAWINGS

In the drawings, wherein the same reference number indicates the same element throughout the views.

DETAILED DESCRIPTION

Embodiments of the technology disclosed herein are directed generally to hatch mechanisms, and associated systems and methods. Hatch mechanisms configured in accordance with embodiments of the present technology can be implemented in spacecraft, aircraft, boats, submarines, other vehicles, buildings, or other suitable structures or devices.

A representative hatch system can include, for example, a base portion surrounding an opening, a hatch portion movable relative to the base portion between a closed configuration in which the hatch portion covers the opening, and an open configuration in which the hatch portion does not fully cover the opening, and a movement mechanism positioned to facilitate moving the hatch portion relative to the base portion between the closed configuration and the open configuration. The movement mechanism can include four arms pivotably attached to the hatch portion and the base portion via four pivot axes. In some embodiments, when the hatch portion is in the closed configuration, the four pivot axes are coplanar. In some embodiments, the pivot axes are spaced apart from a sealing plane between the hatch portion and the base portion. In some embodiments, the arms traverse a periphery of the hatch portion. A representative vehicle system (e.g., an aerospace vehicle system) can include a wall portion of a vehicle and a hatch system supported in the wall portion. A movement mechanism of the hatch system can facilitate moving the hatch portion in a way that keeps the sealing surface facing away from an interior of the vehicle.

In general, hatch mechanisms configured in accordance with embodiments of the present technology facilitate opening and closing the hatch while confining the motion of the hatch such that the sealing face is facing away from an interior of a spacecraft or other vehicle, which protects the seal from activities within the interior of the vehicle, and which can protect from unnecessary wear on the sealing surface. Hatch mechanisms according to the present technology also consume reduced (e.g., minimal) volume within a vehicle (i.e., they are compact for space-efficient operation and implementation).

Several details describing structures and processes that are well-known and often associated with vehicle structures are not set forth in the following description to avoid obscuring other aspects of the disclosure. Moreover, although the following disclosure sets forth several embodiments, several other embodiments can have configurations, arrangements, and/or components that are different than those described in this detailed description section. In particular, other embodiments may have additional elements, and/or may lack one or more of the elements described below with reference to FIGS. 1-6C.

Overview of the Hatch Mechanisms

Figures 1A, 1B, 1C:
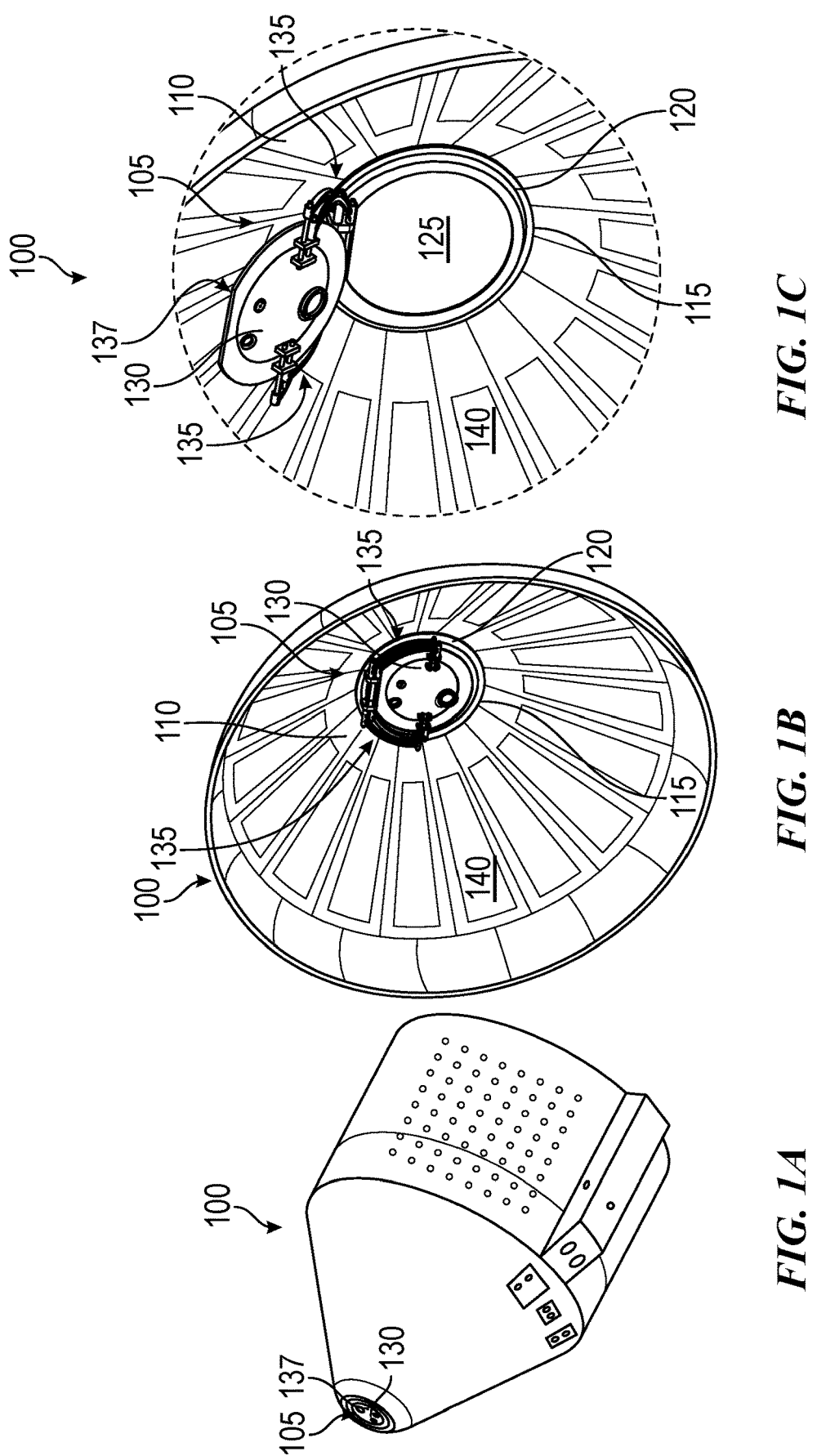
FIG. 1A illustrates a partially schematic perspective view of a vehicle system having a hatch system configured in accordance with embodiments of the present technology.
FIG. 1B illustrates a partially schematic internal perspective view of part of the vehicle system shown in FIG. 1A, in which the hatch system is closed.
FIG. 1C illustrates a partially schematic internal perspective view of part of the vehicle system shown in FIG. 1A, in which the hatch system is open.

FIG. 1A illustrates a partially schematic perspective view of a vehicle system 100 having a hatch system 105 configured in accordance with embodiments of the present technology. In some embodiments, the vehicle system 100 includes a spacecraft or other aerospace vehicle system. In further embodiments, the vehicle system 100 can include a seagoing or land vehicle. The hatch system 105 is openable and closeable, and facilitates access to an interior of the vehicle system 100, such as entry into, or exit from, the vehicle system 100.

FIG. 1B illustrates a partially schematic internal perspective view of part of the vehicle system 100 in which the hatch system 105 is closed. FIG. 1C illustrates a partially schematic internal perspective view of part of the vehicle system 100 in which the hatch system 105 is open. In some embodiments, the vehicle system 100 can include a wall portion 110 that can define an external and/or internal wall of the vehicle system 100. The wall portion 110 can include a wall opening 115 for receiving at least a portion of the hatch system 105. The wall opening 115 is understood to be any suitable opening through the wall portion 110 that the hatch system 105 can selectively cover. The hatch system 105 covers the wall opening 115 but can be opened to allow passage through the wall opening 115.

In some embodiments, the hatch system 105 can include a base portion 120 supported in the wall portion 110 and the wall opening 115. The base portion 120 can have a hatch opening 125, such that the base portion 120 surrounds the hatch opening 125, and the hatch opening 125 is positioned in, and part of, the wall opening 115. The base portion 120 can function as a mounting assembly for at least part of the hatch system 105 to be attached to the wall portion 110. In some embodiments, the base portion 120 includes a ring and/or frame within the wall opening 115.

The hatch system 105 can further include a hatch portion 130 that is movably attached to the base portion 120 and/or to the wall portion 110, for example, via a movement mechanism 135. The movement mechanism 135 is configured and positioned to facilitate movement of the hatch portion 130 between a closed configuration (see, e.g., FIG. 1B) in which the hatch portion 130 covers the hatch opening 125 and engages the base portion 120 at a sealing plane described in further detail below, and an open configuration (see, e.g., FIG. 1C) in which the hatch portion 130 is spaced apart from the base portion 120 and the hatch opening 125 to allow access through the hatch opening 125. The hatch portion 130 can have an outwardly facing side 137 that faces outside of the vehicle system 100 and/or away from the wall portion 110 when the hatch portion 130 is in the closed configuration.

Embodiments of the present technology facilitate moving the hatch portion 130 such that throughout movement between the closed configuration and the open configuration, the outwardly facing side 137 faces away from an interior region 140 (e.g., it can face toward the wall portion 110), which keeps the sealing interface of the hatch portion 130 generally facing away from the interior region 140 of the vehicle system 100. By keeping the sealing interface facing away from the interior region 140 (e.g., between the hatch portion 130 and the wall portion 110), the sealing interface is protected from activities inside the interior region 140. Although the hatch system 105 is shown as having a rounded shape with a straight portion, in other embodiments, the hatch system 105 can include other shapes, such as circles, ovals, and/or polygons.

Figures 2A, 2B, 2C:
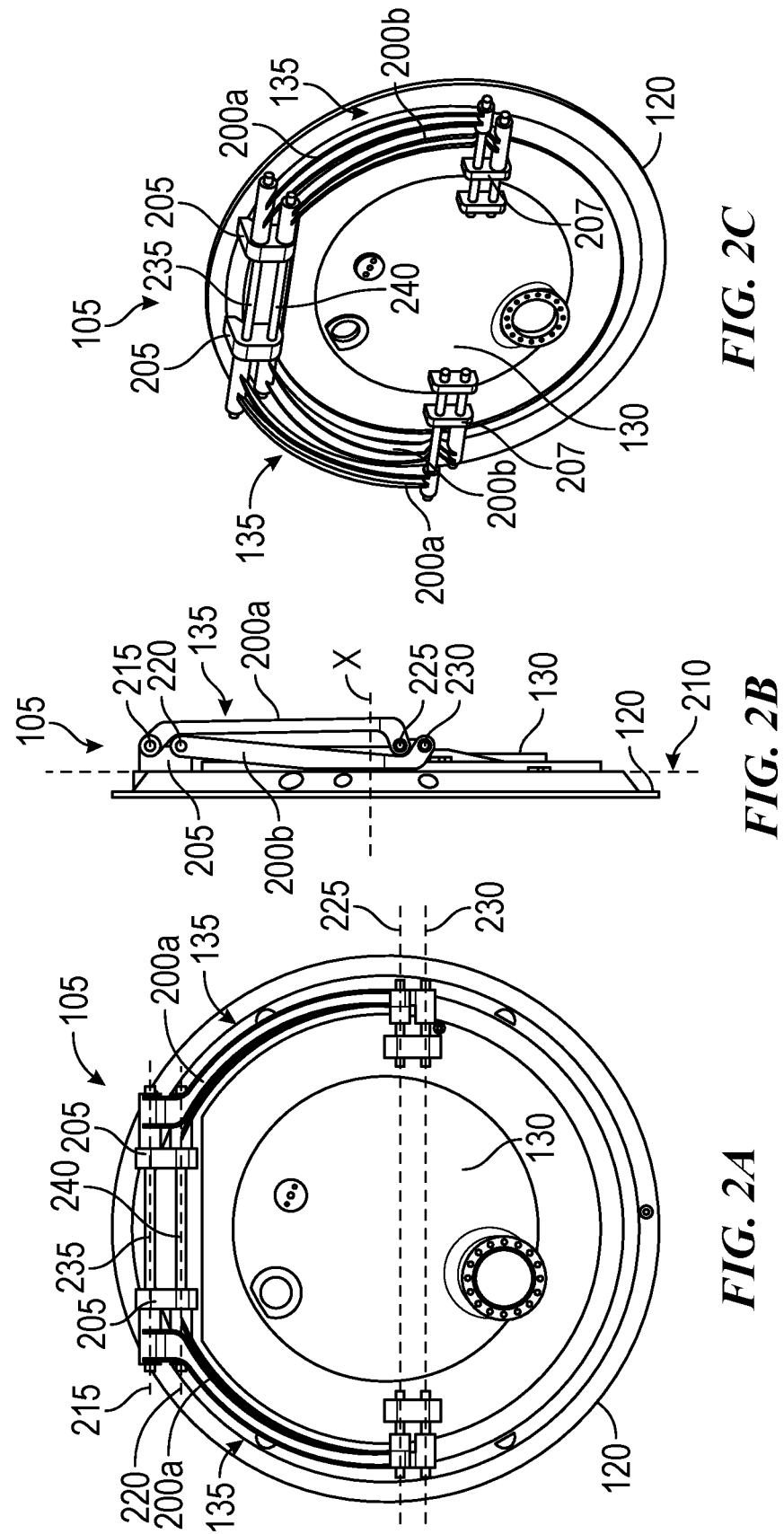
FIG. 2A illustrates a partially schematic front (e.g., from an interior perspective) view of the hatch system shown in FIGS. 1A-1C, in a closed configuration.
FIG. 2B illustrates a partially schematic side view of the hatch system shown in FIGS. 1A-1C, in a closed configuration.
FIG. 2C illustrates a partially schematic interior perspective view of the hatch system shown in FIGS. 1A-1C, in a closed configuration.

FIGS. 2A, 2B, and 2C illustrate partially schematic front (e.g., from an interior perspective), side, and interior perspective views, respectively, of the hatch system 105 in a closed configuration, in accordance with some embodiments of the present technology. In some embodiments, the movement mechanism 135 can include two first arms 200a symmetrically positioned opposite each other generally around a periphery of the hatch portion 130, and two second arms 200b symmetrically positioned opposite each other generally around the periphery of the hatch portion 130. The arms 200a, 200b are pivotably attached to both the base portion 120 and the hatch portion 130. In some embodiments, the arms 200a, 200b are pivotably attached to the base portion 120 via one or more base pivot structures 205. In some embodiments, the arms 200a, 200b can be pivotably attached to the hatch portion 130 via one or more hatch pivot structures 207.

With specific reference to FIG. 2B, a sealing plane 210 can be defined as a plane of contact and/or sealing between the base portion 120 and the hatch portion 130 (which can carry a seal element such as an elastomeric or other suitable type of seal). The base portion 120 and the hatch portion 130 can meet and/or engage each other at the sealing plane 210 to seal the hatch system 105. When the hatch portion 130 is in the closed configuration, the outwardly facing side 137 of the hatch (not visible in FIGS. 2A-2C, but understood to be opposite the visible side shown in FIG. 2A) engages the base portion 120 to form a seal between the interior region 140 (see FIG. 1) and the external environment or the other side of a wall.

In some embodiments, the first arms 200a are pivotable relative to the base portion 120 about a first base pivot axis 215. The second arms 200b can be pivotable relative to the base portion 120 about a second base pivot axis 220. The first and second base pivot axes 215, 220 can be spaced apart from the sealing plane 210, for example, by the same distance from the sealing plane 210. Similarly, the first arms 200a are pivotable relative to the hatch portion 130 about a first hatch pivot axis 225, and the second arms 200b are pivotable relative to the hatch portion 130 about a second hatch pivot axis 230. The first and second hatch pivot axes 225, 230 can be spaced apart from the sealing plane 210 (e.g., by the same distance from the sealing plane 210 as each other, and/or by the same distance as the base pivot axes 215, 220).

In some embodiments, when the hatch portion 130 is closed, the hatch portion 130 can be between the sealing plane 210 and the pivot axes 215, 220, 225, 230. In some embodiments, when the hatch portion 130 is closed, the pivot axes 215, 220, 225, 230 can be in the same plane, but spaced apart from each other. With specific reference to FIGS. 2A and 2C, in some embodiments, the first arms 200a can be connected to each other via a connecting structure 235 (such as a bar element) that extends between two base pivot structures 205. In some embodiments, the second arms 200b can be connected to each other via a connecting structure 240 (such as a bar element) that extends between the two base pivot structures 205, or between two other base pivot structures 205. The connecting structure 235 can be integral with the first arms 200a (thereby forming an integral first arm unit that includes both first arms) or it can be a separate structure connected to the first arms 200a. Likewise, the connecting structure 240 can be integral with the two second arms 200b (thereby forming an integral second arm unit that includes both second arms) or it can be a separate structure connected to the second arms 200b. In some embodiments, at least one of the second arms 200b can extend between a hatch pivot structure 207 and a base pivot structure 205 such that it is between at least one of the first arms 200a and the hatch portion 130 when the hatch portion is in the closed configuration. In other words, the arms 200a, 200b can generally nest on or around each other to minimize overall volume of the hatch system 105 and to allow the hatch portion 130 to rotate between the arms 200a, 200b during movement to and from the open configuration.

Figures 3A, 3B, 3C:
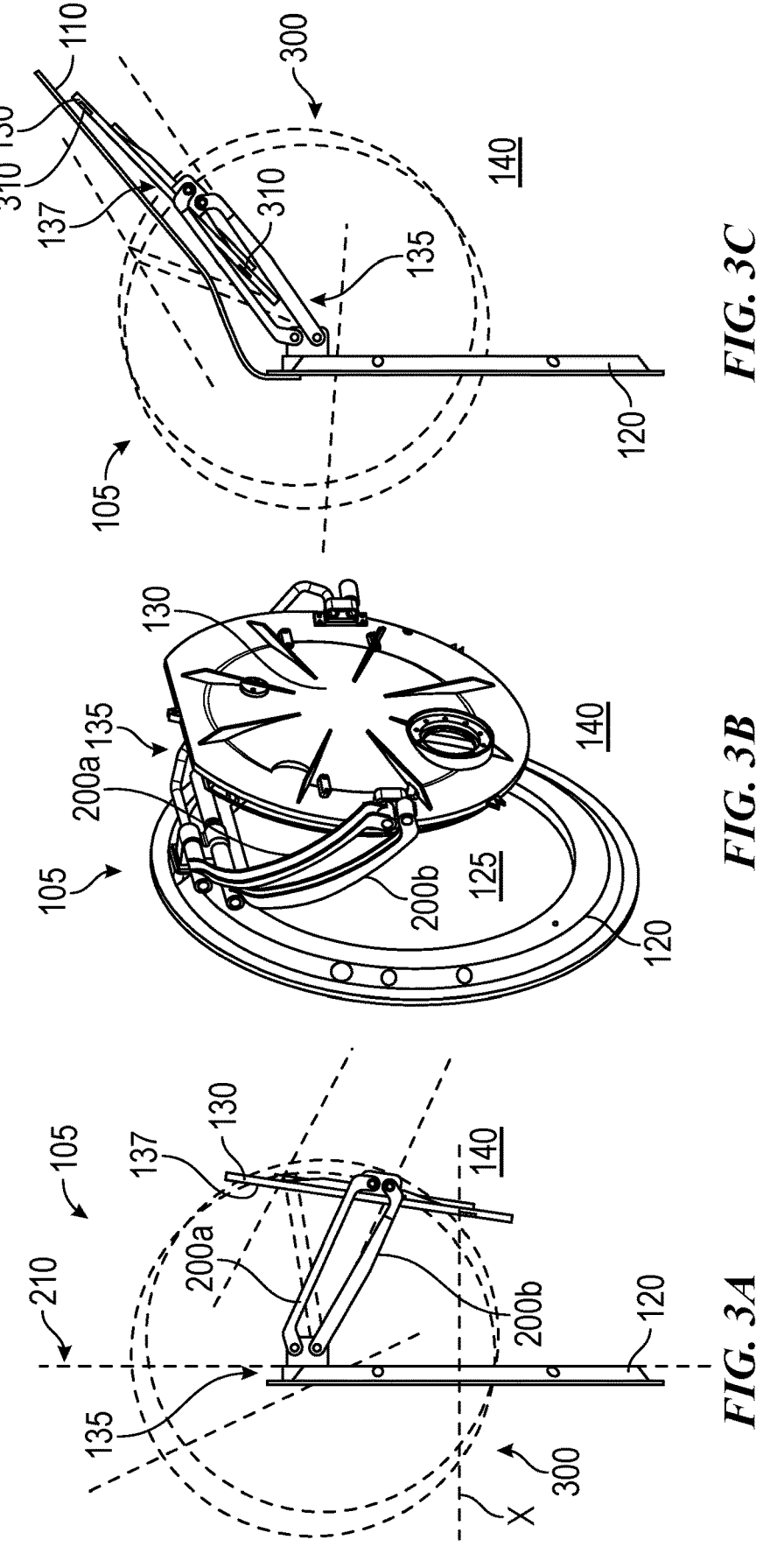
FIG. 3A illustrates a partially schematic side view of the hatch system shown in FIGS. 1A-1C, in a partially open configuration (i.e., between being fully open and fully closed)
FIG. 3B illustrates a partially schematic interior perspective view of the hatch system shown in FIGS. 1A-1C, in the partially open configuration shown in FIG. 3A.
FIG. 3C illustrates a partially schematic side view of the hatch system shown in FIGS. 1A-1C, in a fully open or at least mostly open configuration.

FIG. 3A illustrates a partially schematic side view of the hatch system 105 in a partially open configuration (i.e. between being fully open and fully closed). FIG. 3B illustrates a partially schematic interior perspective view of the hatch system 105 in the partially open configuration shown in FIG. 3A. FIG. 3C illustrates a partially schematic side view of the hatch system 105 in a fully open or at least mostly open configuration. With reference to FIGS. 1C, 3A, 3B, and 3C, in some embodiments, the outwardly facing side 137 of the hatch portion 130 can face the wall portion 110 and/or the base portion 120 throughout movement between the open configuration and the closed configuration. For example, when the hatch portion 130 is in the open configuration, as shown generally in FIG. 3C, the outwardly facing side 137 faces the wall portion 110, where it can be flush or nearly flush with the wall portion 110, parallel to the wall portion 110, and/or where a seal element 310 carried by the hatch portion 130 for sealing against the base portion 120 can be positioned between the hatch portion 130 and the wall portion 110. The dashed lines in FIGS. 3A and 3C illustrate a movement path 300 that the hatch system 105 can follow to enable keeping the outwardly facing side 137 and/or the seal element 310 carried by the outwardly facing side 137 away from the interior region 140, thereby protecting the seal element 310 and keeping the hatch system 105 compact.

The arrangement of the first arms 200a and the second arms 200b provides geometric constraints that confine the movement of the hatch portion 130 relative to the base portion 120. The hatch portion 130 can also pass between the arms 200a, 200b. With reference to FIG. 3A, as the hatch portion 130 moves upward, the first arms 200a push the hatch portion 130, and the second arms 200b pull the hatch portion 130, so that it rotates toward its position in FIG. 3C. The arrangement of the arms 200a, 200b also confines movement of the hatch portion 130 relative to the base portion 120 such that, for at least a portion of the movement of the hatch portion 130 between the closed configuration and the open configuration, particularly a portion of the movement just before opening or just before closing, the hatch portion 130 moves only or at least mostly along a longitudinal axis X normal to the sealing plane 210. In other words, the hatch portion 130 lands normal or generally normal to the sealing plane 210. This advantageously provides less wear on the sealing interface at the sealing plane 210.

Figure 4:
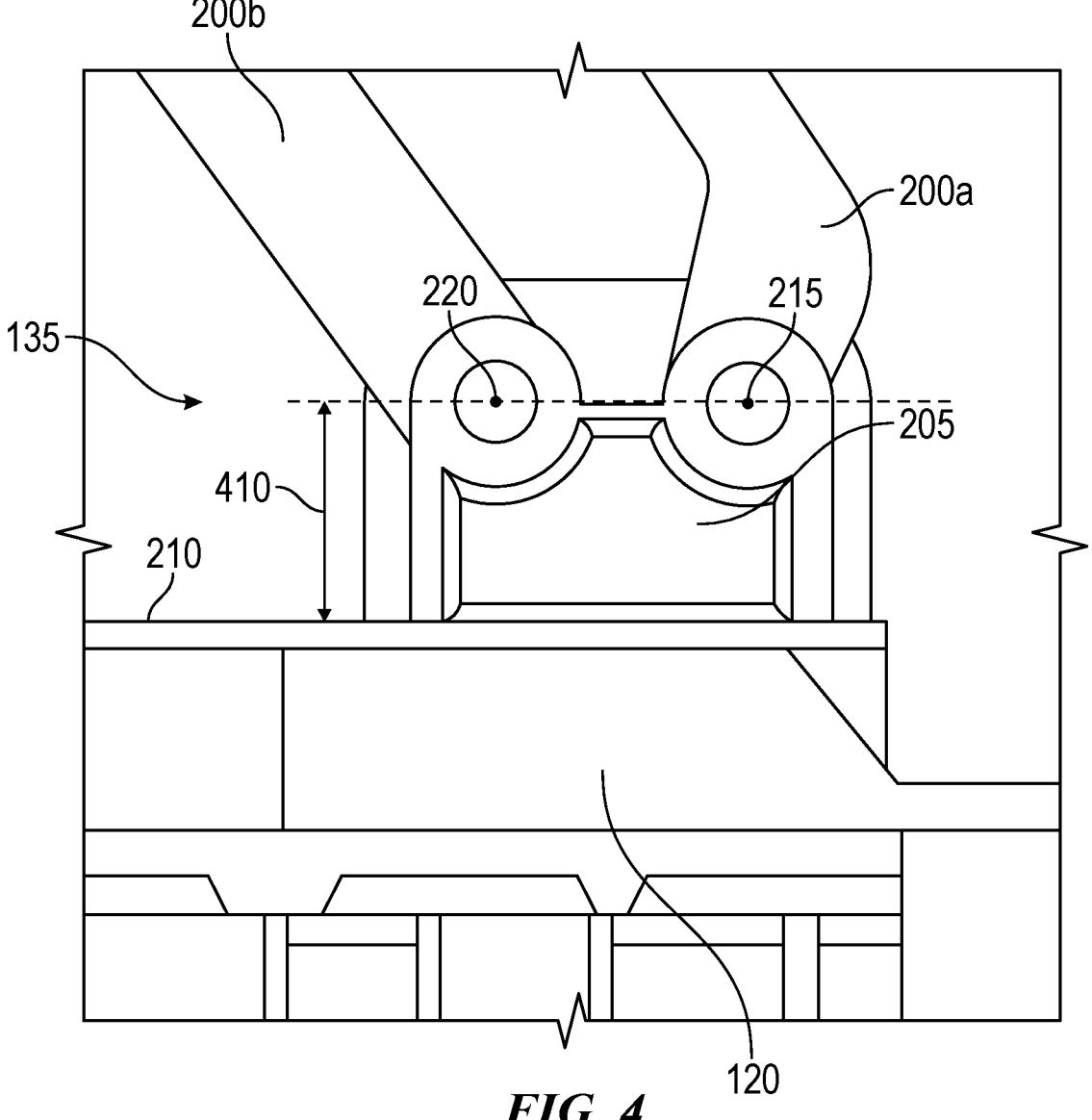
FIG. 4 illustrates a partially schematic side view of a portion of a mechanism for a hatch system, in accordance with embodiments of the present technology.

FIG. 4 illustrates a partially schematic side view of a portion of the movement mechanism 135. Specifically, FIG. 4 shows a first arm 200a and a second arm 200b pivotally attached to the base portion 120 via the base pivot structure 205. In FIG. 4, the hatch portion 130 (not visible in FIG. 4) is open, as indicated by the positions of the arms 200a, 200b. The base pivot structure 205 provides an offset distance 410 between the sealing plane 210 and the pivot axes 215, 220 of the arms 200a, 200b.

Figure 5:
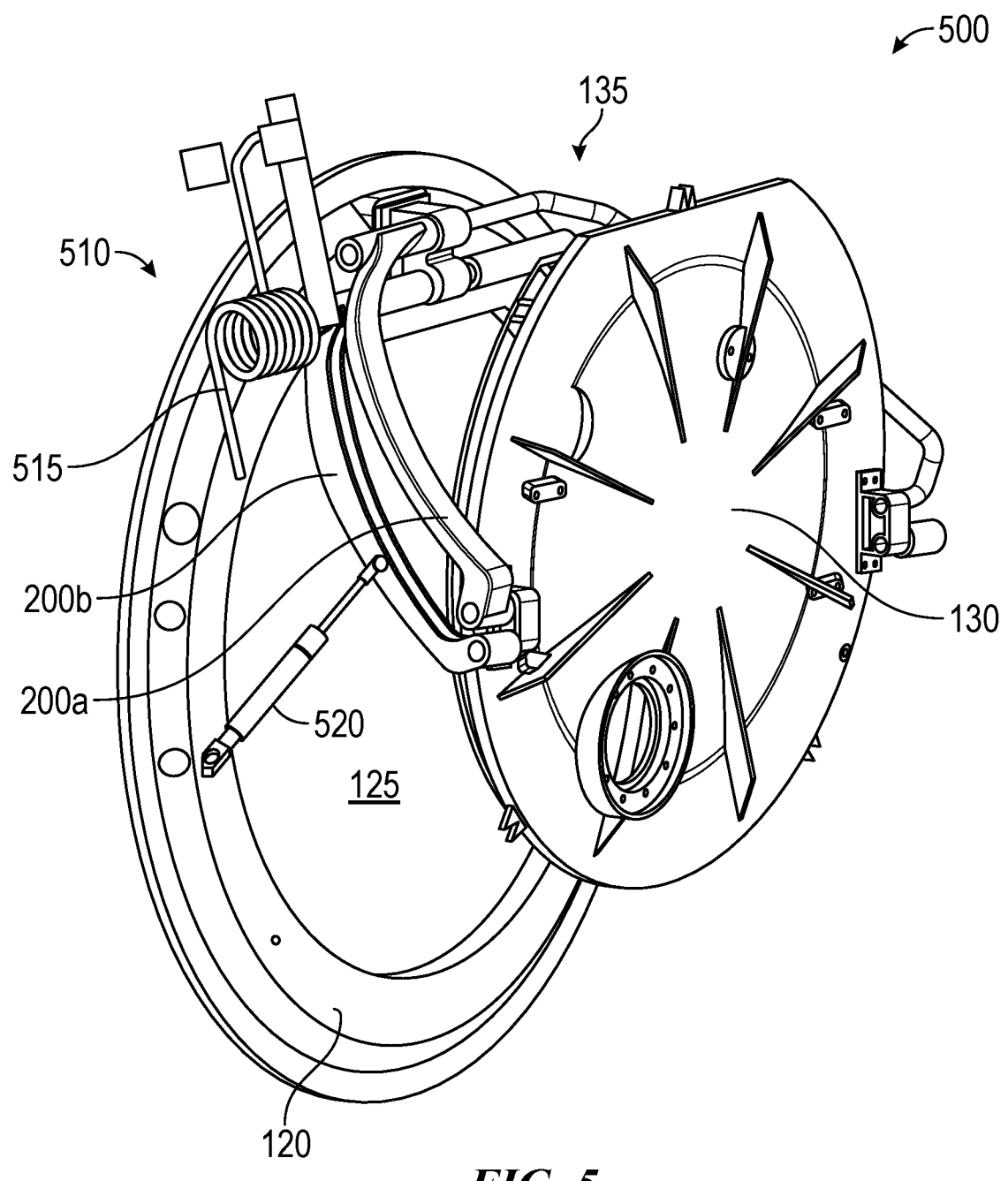
FIG. 5 illustrates a schematic perspective view of a hatch system configured in accordance with additional embodiments of the present technology.

FIG. 5 illustrates a schematic perspective view of a hatch system 500 configured in accordance with additional embodiments of the present technology. The hatch system 500 can be similar or mostly the same as the hatch system 105 described above with regard to FIGS. 1A-4, except that it can further include a damping system 510 for controlling the force required for a user to operate the hatch system 500 and/or for controlling the speed of opening and closing the hatch system 500. In some embodiments, the damping system 510 can include a biasing element 515 (such as a spring, shown schematically in FIG. 6) and/or a strut element 520 (which can be a pneumatic and/or hydraulic strut element, or other suitable damping element). In some embodiments, each of the biasing element 515 and the strut element 520 can be connected to the base portion 120 and a moving portion of the hatch system 500, such as one or both of the second arms 200b. In some embodiments, the damping ratio of the damping system 510 can be selected to overdamp the damping system 510, with a low angular speed, such that an operator can operate the hatch system 500 with one hand and/or with controlled resistance. In general, in various embodiments, the damping system 510 can be operatively positioned between the hatch portion 130 and the base portion 120, and/or between the base portion 120 and one or more of the arms 200a, 200b.

Geometry of Hatch Systems

The function and general arrangement of several embodiments of the present technology are described above with regard to FIGS. 1-5. Some embodiments of the geometry that facilitates the foregoing arrangement and function is described below in additional detail with regards to FIGS. 6A-6C.

Figures 6A, 6B, 6C:
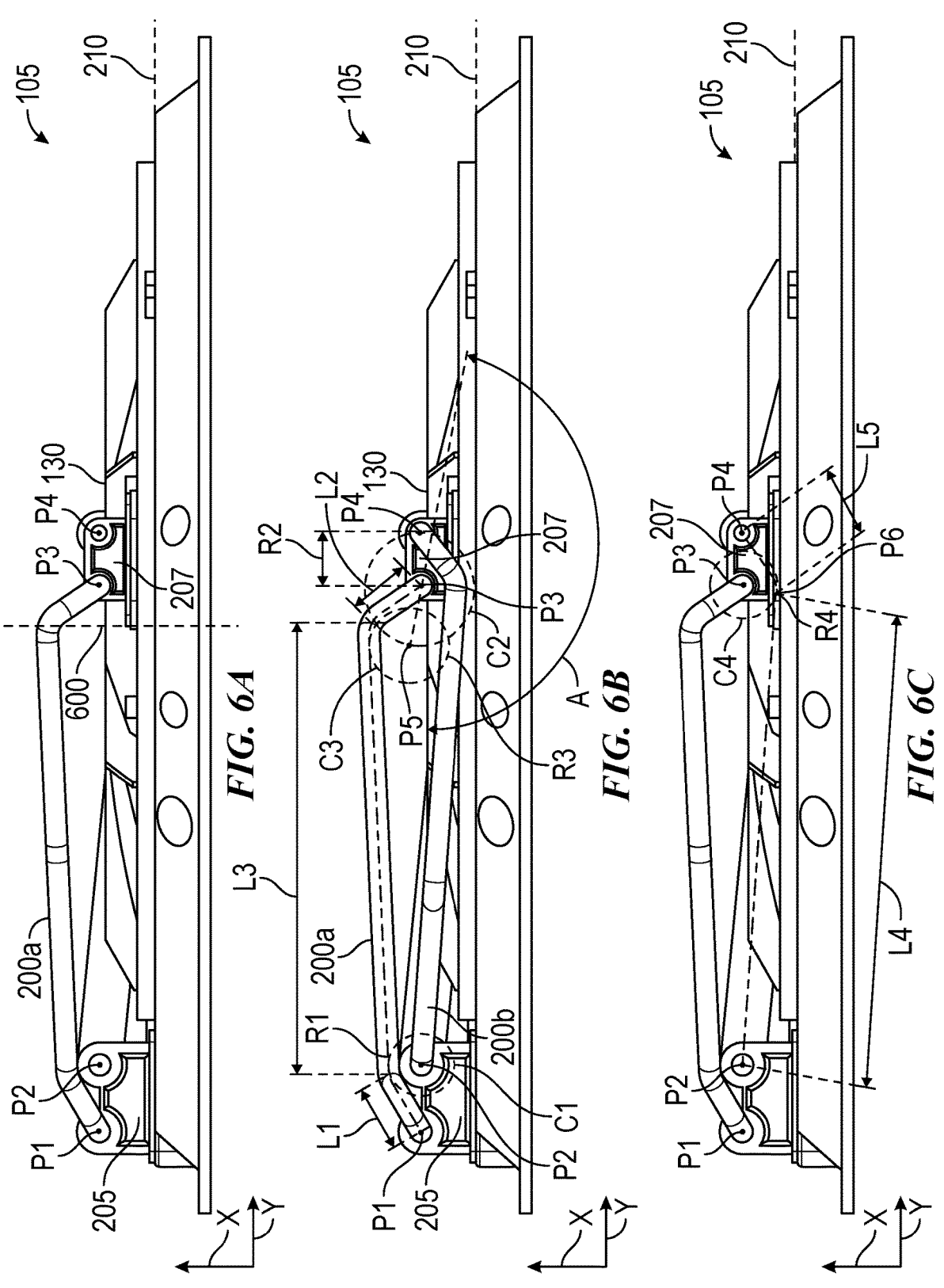
FIGS. 6A, 6B, and 6C illustrate partially schematic side views of portions of a hatch system configured in accordance with embodiments of the present technology.

FIGS. 6A, 6B, and 6C illustrate partially schematic side views of portions of the hatch system 105. With reference to each of FIGS. 6A, 6B, and 6C, the axes of rotation of each of the arms 200a, 200b can be at points P1, P2, P3, and P4, where P1 and P2 are located on the pivot axes 215, 220, respectively (see FIG. 4), and where P3 and P4 are located on the pivot axes 225, 230, respectively (see FIG. 2A). The points P1, P3 correspond to the positions of the rotation axes for the first arms 200a, and the positions P2, P4 correspond to the positions of the rotation axes for the second arms 200b. The sealing plane 210 and a transverse axis 600 of the hatch portion 130 are also shown. For convenience in description, a coordinate system is also shown, with the Y-axis extending parallel to the sealing plane 210 and the X-axis extending normal to the sealing plane 210, parallel to the transverse axis 600 of the hatch portion 130.

In some embodiments, each of the points P1, P2, P3, P4 can be spaced apart from the sealing plane 210 along the X-axis by an offset distance of 2.56 inches. In some embodiments, points P1 and P2 can be spaced apart from the transverse axis 600 along the Y-axis by distances of 23.25 inches and 20.25 inches, respectively. In some embodiments, points P3 and P4 can be spaced apart from the transverse axis 600 along the Y-axis, by distances of 1.5 inches and 3.927 inches, respectively, with both points P3 and P4 together being positioned opposite from the points P1 and P2 relative to the transverse axis 600. In some embodiments, a ratio of (a) a distance between P2 and P4 (i.e., the pivot radius) to (b) the offset distance between the plane containing P1, P2, P3, and P4 (e.g., offset distance 410 in FIG. 4), can be 10:1, for example, or it can be other values. The inventors discovered that an offset distance along the X-axis of about 10% of the pivot radius (between P2 and P4) can provide a suitable (e.g., optimal) configuration.

In some embodiments, the size and/or shape of the first arms 200a can be defined as follows. With reference to FIG. 6B, each first arm 200a can have three segments L1, L2, L3. L1 can be bent relative to L3 around a radius R1 of a circle C1 centered at P2. L2 can be bent relative to L3 at a location along a circle C2 centered around P3 having a radius R2 defined by the distance between P3 and P4. L2 can be bent relative to L3 around a radius R3 of a circle C3 centered about a point P5 on the circle C2. The location of point P5 can be defined by an angle A between a line extending between P5 and P3, and a line extending from P3 along the Y-axis (i.e., along the sealing plane 210). The angle A can be defined as the angle between a line including P3 and P4, and a line including P3 and P5. The angle A represents an angle of the hatch portion 130 when it is fully opened, and can be selected depending on design needs.

In some embodiments, C1 constrains where the first arm 200*a* can move so it does not interfere with the second arm 200*b*. Minimizing C1 helps minimize the overall size of the system 105 (e.g., it minimizes how far arm 200*a* extends away from the sealing plane 210). In some embodiments, R1 is the sum of a radius of a cross-section of the first arm 200*a* (or a distance from a centerline of the arm 200*a* to an edge closest to P2, for embodiments in which the arm is not circular), plus half of a thickness of the second arm 200*b* at or near point P2, plus suitable tolerances to minimize interference between the first arm 200*a* and the second arm 200*b*. In some embodiments, L1 can be defined as being tangent to the circle C1 and including the point P1. The circle C2 is centered around P3 and has a radius R2 defined as the distance between P3 and P4. The radius R2 can be limited by the offset distance between P4 and the sealing plane 210 along the X-axis (which in some embodiments is also the offset distance of P1, P2, and P3 along the X-axis). The circle C3 is centered around point P5 and has a radius R3 that can be defined as the sum of a radius of a cross-section of the first arm 200*a* (or a distance from a centerline of the arm 200*a* to an edge closest to P5, for embodiments in which the arm is not circular), plus half of a thickness of the second arm 200*b* at or near point P5, plus suitable tolerances to minimize interference. L2 can be defined as being tangent to the circle C3 and including the point P3.

With reference to FIG. 6C, the shape and/or size of the second arms 200*b* can be defined as follows. Note that the second arm 200*b* is only shown in FIG. 6C in the form of components/lengths L4 and L5 (which one can see correspond to two portions of the second arm 200*b* shown in FIG. 6B). A circle C4 having a radius R4 can be centered around P3. R4 can be defined as the sum of a radius of a cross-section of the second arm 200*b* (or a distance from a centerline of the arm 200*b* to an edge closest to P3, for embodiments in which the arm is not circular), plus half of a thickness of the first arm 200*a* at or near point P3, plus suitable tolerances to minimize interference between the first arm 200*a* and the second arm 200*b* or between the second arm 200*b* and other nearby structures. C4 defines an envelope of space that avoids interference between components. In some embodiments, a length L4 of a portion of the second arm 200*b* can extend from P2 to a point P6 on C4, where the line of L4 is tangent to the circle C4 at P6. The second arm 200*b* can be bent toward P4 from P6 and extend along a length L5 to P4. L5 is also tangent to circle C4 at point P6. Accordingly, the second arm 200*b* can have a first portion having a length L4, and a second portion having length L5, and those portions can be connected at a point P6, which is on the circle C4 having a radius R4, and where the lines defining lengths L4 and L5 are each tangent to the circle C4.

In general, when the hatch portion 130 is in the closed configuration, a shape or contour of each first arm 200*a* can be defined as having a first portion (e.g., L1) extending from the first base pivot axis 215 (P1), away from the sealing plane 210, bending back toward the sealing plane 210 at a second portion (e.g., L3), and then having a third bend toward the sealing plane 210 at a third portion (e.g., L2), such that the third portion extends to the first hatch pivot axis 225 (P3). In other words, each first arm 200*a* can include a plurality of bends or curves to space the first arm 200*a* away from the hatch portion 130 and away from the second arm 200*b* just enough to avoid interference without unnecessarily increasing the overall volume of the hatch system 105.

When the hatch portion 130 is in the closed configuration, a shape or contour of each second arm 200*b* can be defined as having a first portion (e.g., L4) extending away from the second base pivot axis 220 (P2), toward the sealing plane 210 to a second portion (e.g., L5) that is angled away from the sealing plane 210 and extends to the second hatch pivot axis 230 (P4). In other words, each second arm 200*b* can include a plurality of bends or curves to avoid interference with other components and without unnecessarily increasing the overall volume of the hatch system 105.

Although one side of the mechanism 135 is shown in FIGS. 6A-6C, the other side may be symmetrical and it may have the same or similar features. The foregoing dimensions may together be scaled up or down by suitable factors to accommodate differently-sized hatch systems 105, and they may be adjusted for suitable tolerances depending on expansion or contraction of materials and other factors. In some embodiments, some dimensions, such as the radii R1, R3, and R4, are constrained or controlled by the size (e.g., thickness) of the arms 200*a*, 200*b*, which can be a function of the load the arms 200*a*, 200*b* need to carry (e.g., the mass of the hatch portion 130). In further embodiments, the arms 200*a*, 200*b* and the positions of the points P1, P2, P3, and P4, can have other characteristics or dimensions.

Advantages of embodiments of the present technology include hatch systems that occupy minimal space, reduce wear on sealing surfaces, and protect the sealing surfaces from activities inside the vehicle. Components of the present technology can be formed from any suitable material and using any suitable manufacturing technique, such as suitable metals, alloys, ceramics, or other materials suitable for space or other operations.

From the foregoing, it will be appreciated that specific embodiments of the disclosed technology have been described herein for purposes of illustration, but that various modifications may be made without deviating from the technology. Although specific quantities, dimensions, or other numerical characterizations are provided for context and/or to indicate representative embodiments, various further embodiments can have other quantities, sizes, or characteristics (for example, sizes, quantities, and/or characteristics commensurate with strength requirements or other variables). For purposes of the present disclosure, a first element that is positioned "toward" an end of a second element is positioned closer to that end of the second element than to a middle or mid-length location of the second element. Numerical adjectives including "first" and "second," or the like, as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims. As used herein, the terms "generally" and "approximately" refer to values or characteristics within a range of ±10% from the stated value or characteristic, unless otherwise indicated. As used herein, the term "and/or" when used in the phrase "A and/or B" means "A, or B, or both A and B." A similar manner of interpretation applies to the term "and/or" when used in a list of more than two terms.

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

We claim:

1. A hatch system for an aerospace vehicle, the hatch system comprising:

a base portion surrounding an opening;

a hatch portion movable relative to the base portion between a closed configuration in which the hatch portion covers the opening, and an open configuration in which the hatch portion does not fully cover the opening; and a movement mechanism positioned to move the hatch portion relative to the base portion between the closed configuration and the open configuration, wherein the movement mechanism comprises two first arms and two second arms;

wherein:

(a) when the hatch portion is in the closed configuration, the hatch portion and the base portion meet at a sealing plane;

(b) each of the first arms is pivotably connected to the base portion at a first base pivot axis and pivotably connected to the hatch portion at a first hatch pivot axis, wherein each of the first arms extends between the first base pivot axis and the first hatch pivot axis around a periphery of the hatch portion when the hatch portion is in the closed configuration, wherein at least part of the hatch portion can pass between the two first arms while moving between the closed configuration and the open configuration;

(c) each of the second arms is pivotably connected to the base portion at a second base pivot axis and pivotably connected to the hatch portion at a second hatch pivot axis, wherein each of the second arms extends between the second base pivot axis and the second hatch pivot axis around a periphery of the hatch portion when the hatch portion is in the closed configuration, wherein at least part of the hatch portion can pass into a lateral space separating the two second arms while moving between the closed configuration and the open configuration;

(d) the first base pivot axis and the second base pivot axis are each spaced apart from the sealing plane.

2. The hatch system of claim 1, wherein the first arms and the second arms confine movement of the hatch portion relative to the base portion such that, for at least a portion of a movement of the hatch portion between the first configuration and the open configuration, the hatch portion moves away from the sealing plane in a direction that is normal to the sealing plane.

3. The hatch system of claim 1, wherein when the hatch portion is in the closed configuration, the first base pivot axis, the second base pivot axis, the first hatch pivot axis, and the second hatch pivot axis are coplanar.

4. The hatch system of claim 1, wherein, when the hatch is in the closed configuration:

a contour of each first arm is defined as extending from the first base pivot axis, away from the sealing plane, and bending toward the first hatch pivot axis and the sealing plane; and a contour of each second arm is defined as extending from the second base pivot axis, toward the sealing plane, and bending toward the second hatch pivot axis and away from the sealing plane.

5. The hatch system of claim 4, wherein, when the hatch is in the closed configuration, a point where each first arm is bent toward the first hatch pivot axis is positioned on a circle having a radius equivalent to a distance between the first hatch pivot axis and the second hatch pivot axis, wherein the radius is less than a distance between the first hatch pivot axis and the sealing plane.

6. The hatch system of claim 1, wherein the movement mechanism further comprises a damping mechanism positioned between the hatch portion and the base portion or between at least one of the arms and the base portion.

7. The hatch system of claim 6, wherein the damping mechanism comprises at least one of a spring or a damping strut.

8. The hatch system of claim 1, further comprising a seal element positionable between the hatch portion and the base portion.

9. The hatch system of claim 1, wherein when the hatch portion is in the closed configuration, the hatch portion is positioned between the first hatch pivot axis and the second hatch pivot axis.

10. The hatch system of claim 1, wherein the two first arms form a first integral arm unit, or wherein the two second arms form a second integral arm unit.

11. The hatch system of claim 1, wherein the two first arms are connected to one another via a bar element passing between a pair of base pivot structures attached to the base portion, and/or the two second arms are connected to one another via a bar element passing between the pair of base pivot structures.

12. The hatch system of claim 1, wherein when the hatch portion is in the closed configuration, the first base pivot axis, the second base pivot axis, the first hatch pivot axis, and the second hatch pivot axis are coplanar and spaced apart from the sealing plane by a distance that is between 9 and 11 percent of a distance between the second base pivot axis and the second hatch pivot axis.

13. A hatch system for an aerospace vehicle, the hatch system comprising:

a base portion surrounding an opening;

a hatch portion movable relative to the base portion between a closed configuration in which the hatch portion covers the opening, and an open configuration in which the hatch portion does not fully cover the opening; and a movement mechanism positioned to move the hatch portion relative to the base portion between the closed configuration and the open configuration, wherein the movement mechanism comprises four arms pivotably attached to the hatch portion and the base portion via four pivot axes;

wherein when the hatch portion is in the closed configuration, the four pivot axes are coplanar.

14. The hatch system of claim 13, wherein when the hatch portion is in the closed configuration, the hatch portion engages the base portion at a sealing plane, and wherein, for at least part of a movement between the closed configuration and the open configuration, the hatch portion moves only along an axis that is normal to the sealing plane.

15. The hatch system of claim 14, wherein when the hatch portion is in the closed configuration, a bend of at least one of the arms is positioned at a distance from the sealing plane that is equivalent to a distance between two of the pivot axes.

16. The hatch system of claim 13, wherein each arm of the four arms includes a first portion that is bent relative to a second portion, and wherein each first portion extends toward, and intersects, a pivot axis of the four pivot axes.

17. The hatch system of claim 13, wherein the movement mechanism further comprises a damping mechanism positioned between the hatch portion and the base portion or between at least one of the arms and the base portion.

18. An aerospace vehicle system comprising:

(a) a wall portion having a first opening;

(b) a base portion supported in the wall portion, wherein the base portion has a second opening positioned within the first opening; and (c) a hatch portion movably attached to the base portion or the wall portion via a movement mechanism configured to facilitate movement of the hatch portion between a closed configuration in which the hatch portion covers the second opening and engages the base portion at a sealing plane, and an open configuration in which the hatch portion is spaced apart from the base portion and the second opening;

wherein:

the movement mechanism comprises (1) a pair of first arms pivotably attached to the base portion at a first base pivot axis and pivotably attached to the hatch portion at a first hatch pivot axis, and (2) a pair of second arms pivotably attached to the base portion at a second base pivot axis and pivotably attached to the hatch portion at a second hatch pivot axis;

the first base pivot axis and the second base pivot axis are coplanar in a plane parallel with the sealing plane;

when the hatch portion is in the closed configuration, (1) the first hatch pivot axis and the second hatch pivot axis are spaced apart from the sealing plane, and (2) a first side of the hatch portion engages the base portion;

when the hatch portion is in the open configuration, the first side of the hatch portion faces the wall portion, and/or a seal element carried by the hatch portion is positioned between the hatch portion and the wall portion; and the first side of the hatch portion faces the wall portion and/or the base portion throughout movement between the open configuration and the closed configuration.

19. The aerospace vehicle system of claim 18, wherein, when the hatch portion is in the closed configuration, a distance along an axis of the sealing plane between the second base pivot axis and the second hatch pivot axis is approximately ten times greater than a distance between the second hatch pivot axis and the sealing plane.

20. The aerospace vehicle system of claim 18, wherein each first arm comprises a first portion extending away from the base portion, a second portion bent relative to the first portion and extending away from the base portion, and a third portion bent relative to the second portion and extending toward the first hatch pivot axis.

* * * * *